(12) United States Patent
D'Aluisio et al.

(10) Patent No.: US 7,380,808 B2
(45) Date of Patent: Jun. 3, 2008

(54) BICYCLE WHEEL SUPPORT WITH VIBRATION ISOLATION

(75) Inventors: Christopher P. D'Aluisio, Watsonville, CA (US); Jean-Luc Callahan, Morgan Hill, CA (US); Mark Schroeder, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 176 days.

(21) Appl. No.: 11/003,692

(22) Filed: Dec. 3, 2004

(65) Prior Publication Data

US 2006/0119069 A1    Jun. 8, 2006

(51) Int. Cl.
*B62K 19/00*    (2006.01)
(52) U.S. Cl. ..................... 280/275; 280/283
(58) Field of Classification Search ........ 280/275–277, 280/283–285
See application file for complete search history.

(56) References Cited

U.S. PATENT DOCUMENTS

| | | | | |
|---|---|---|---|---|
| 628,723 | A | * | 7/1899 | McKee ........................ 280/285 |
| 937,614 | A | * | 10/1909 | Lampel ........................ 280/276 |
| 1,056,492 | A | * | 3/1913 | Bilsten ........................ 280/284 |
| 1,559,277 | A | | 10/1925 | Nelson |
| 2,236,127 | A | | 3/1941 | Alexander |
| 3,941,011 | A | | 3/1976 | Kirk |
| 4,047,731 | A | | 9/1977 | VanAuken |
| 4,420,989 | A | | 12/1983 | Finkle |
| 4,939,950 | A | | 7/1990 | Girvin |
| 5,117,708 | A | | 6/1992 | Boyer et al. |
| 5,133,529 | A | | 7/1992 | Kashima et al. |
| 5,140,867 | A | | 8/1992 | Smith |
| 5,181,436 | A | | 1/1993 | Lai |
| 5,186,074 | A | | 2/1993 | Arnold |
| 5,195,766 | A | | 3/1993 | Dohrmann et al. |
| 5,209,138 | A | | 5/1993 | Shu |
| 5,209,508 | A | | 5/1993 | Lennon |
| 5,220,851 | A | | 6/1993 | Flechel |
| 5,241,881 | A | | 9/1993 | Chen |
| 5,253,544 | A | | 10/1993 | Allsop et al. |
| 5,257,552 | A | | 11/1993 | Boyer et al. |
| 5,285,697 | A | | 2/1994 | Clausen |
| 5,319,995 | A | | 6/1994 | Huang |
| 5,377,557 | A | | 1/1995 | Nastrucci |
| 5,403,028 | A | * | 4/1995 | Trimble ........................ 280/284 |
| 5,405,159 | A | | 4/1995 | Klein et al. |
| 5,427,208 | A | * | 6/1995 | Motobu et al. ............. 280/277 |
| 5,467,665 | A | | 11/1995 | Huang |
| 5,511,444 | A | | 4/1996 | Clausen et al. |

(Continued)

FOREIGN PATENT DOCUMENTS

DE    20106106    6/2001

(Continued)

*Primary Examiner*—Lesley D. Morris
*Assistant Examiner*—Marc A. Scharich
(74) *Attorney, Agent, or Firm*—Michael Best & Friedrich LLP (57) ABSTRACT

A bicycle designed to reduce the transfer of vibrations to the rider. The bicycle includes a frame having a first frame element and a second frame element. A first wheel is coupled to the frame and a damping member is disposed between the first frame element and the second frame element. The damping member provides vibration damping between the first frame element and the second frame element.

7 Claims, 7 Drawing Sheets

U.S. PATENT DOCUMENTS

| | | |
|---|---|---|
| 5,657,958 A | 8/1997 | McLaughlin et al. |
| 5,678,457 A | 10/1997 | Hals |
| 5,842,711 A | 12/1998 | Legerot |
| 6,092,823 A * | 7/2000 | Busby .................. 280/284 |
| 6,109,637 A | 8/2000 | Kirk |
| 6,170,845 B1 | 1/2001 | Tseng |
| 6,267,399 B1 * | 7/2001 | Buckmiller et al. ........ 280/274 |
| 6,374,697 B1 | 4/2002 | Brandl et al. |
| 6,505,847 B1 * | 1/2003 | Greene .................. 280/284 |
| 6,561,058 B1 | 5/2003 | Steinke |
| 6,669,218 B1 | 12/2003 | Sinyard et al. |
| 6,761,241 B2 * | 7/2004 | Kohda .................. 180/219 |
| 6,783,140 B1 | 8/2004 | Huang |
| 6,783,142 B1 * | 8/2004 | Schober ................ 280/284 |
| 2003/0226421 A1 | 12/2003 | Livingston |
| 2004/0145148 A1 * | 7/2004 | Klein .................. 280/284 |
| 2005/0248118 A1 * | 11/2005 | D'Aluisio et al. ......... 280/275 |

FOREIGN PATENT DOCUMENTS

| | | |
|---|---|---|
| JP | 4-243679 * | 8/1992 |
| WO | WO 01/96173 | 12/2001 |

* cited by examiner

BICYCLE WHEEL SUPPORT WITH VIBRATION ISOLATION

BACKGROUND

The present invention generally relates to bicycles, and particularly to bicycle frames that are designed to dampen vibrations.

Bicycles include a frame that is supported by two wheels. The frame supports a seat for a rider, and handlebars that allow the rider to steer the bicycle. A front fork extends from the frame and rotates relative to the frame to allow the rider to steer and control the bicycle. The frame also supports the rear wheel of the bicycle and the drive mechanism including the chain, pedals, gears, derailleur, and the like.

During a bicycle ride, the rider will often encounter bumps or uneven road conditions that cause vibrations. Many of these vibrations will travel through the wheels and the frame to the seat and handlebars. From the seat and handlebars, the vibrations can pass into the rider's torso and arms. These vibrations can be uncomfortable to the rider.

SUMMARY

The present invention provides a bicycle designed to reduce the transfer of vibrations to the rider. The bicycle includes damping members disposed between the front and/or rear dropout members and the frame. The damping members are generally formed from a resilient elastomer. The damping members at least partially isolate the frame from the wheels such that vibrations encountered by the wheels are inhibited from transfer to the rider or are greatly reduced before transferring to the rider.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION OF THE DRAWINGS

Figure 1:
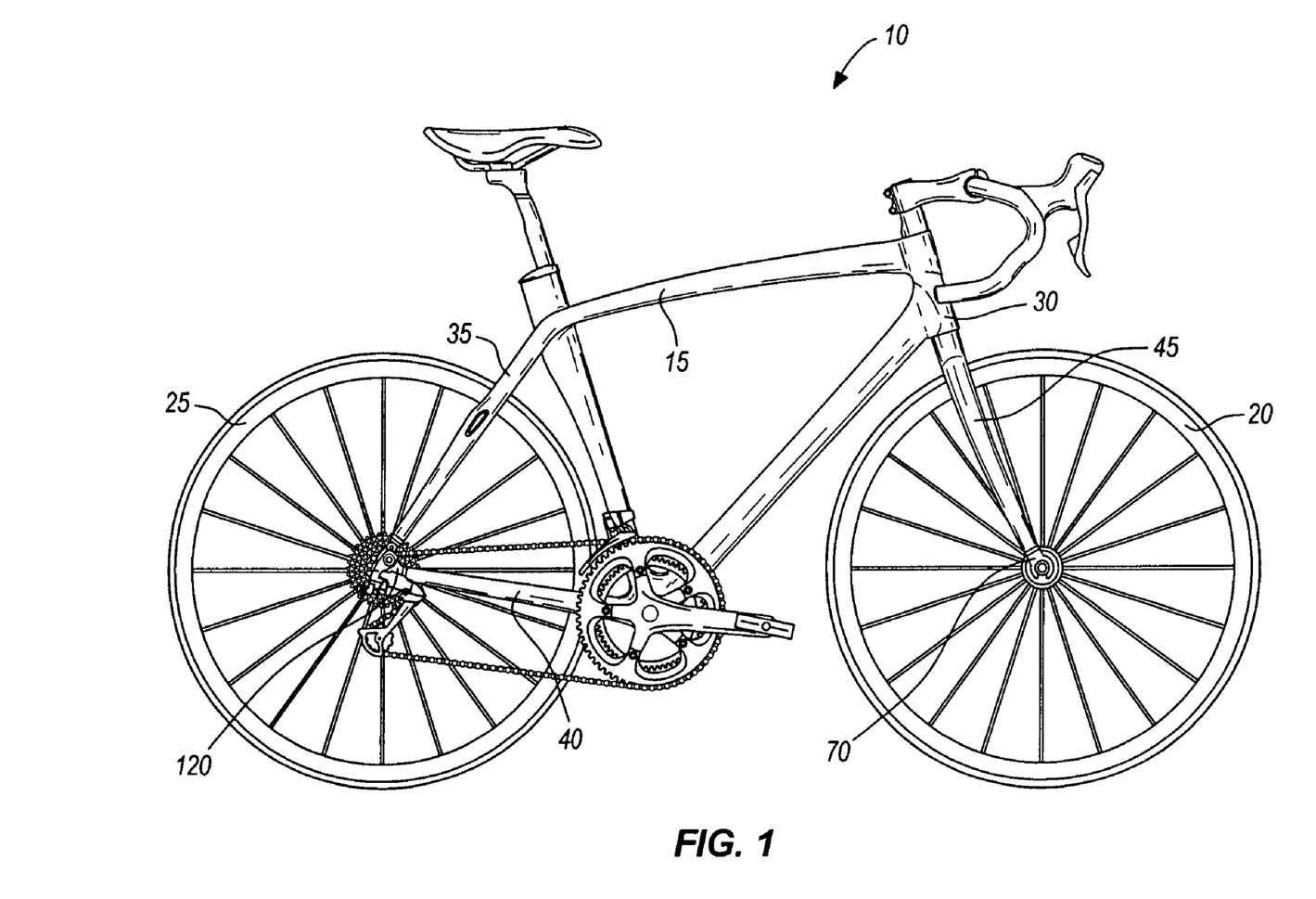
FIG. 1 is a side view of a bicycle embodying the present invention and including a front wheel, a rear wheel, and a frame.

FIG. 1 illustrates a bicycle 10 that includes a frame 15, a front wheel 20, and a rear wheel 25. The frame 15 includes a head tube 30, seatstays 35, and chainstays 40. The frame 15 can be manufactured from metal, such as steel, aluminum, or titanium. Alternatively, the frame can be formed from a composite material, such as KEVLAR or carbon fiber, that provides for significant strength, while reducing the overall weight of the bicycle 10. The frame could also be made from a combination of the above and other materials.

Figure 2:
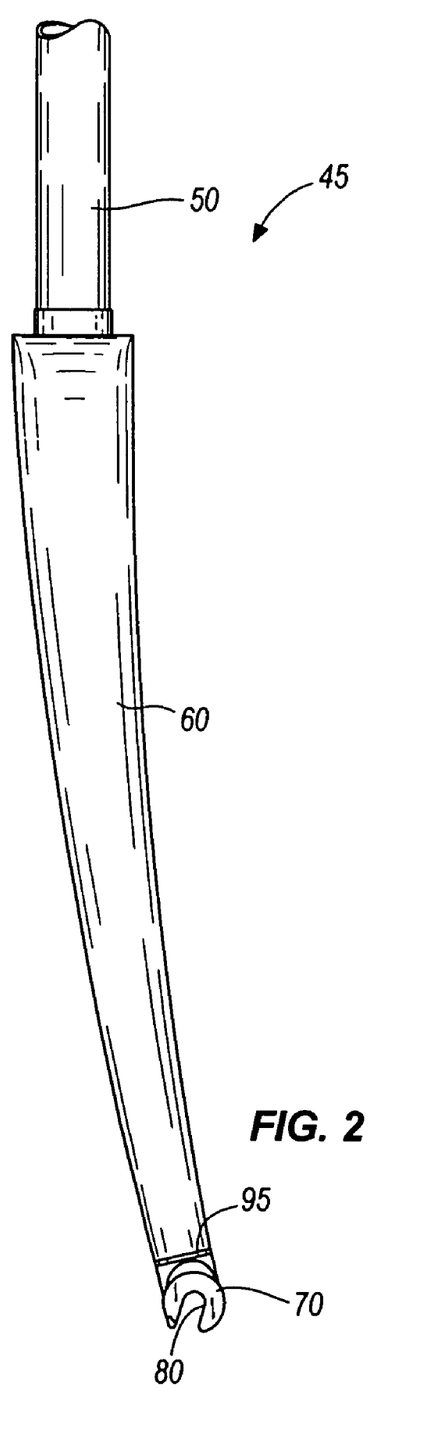
FIG. 2 is a side view of a front fork of the bicycle of FIG. 1.
Figure 3:
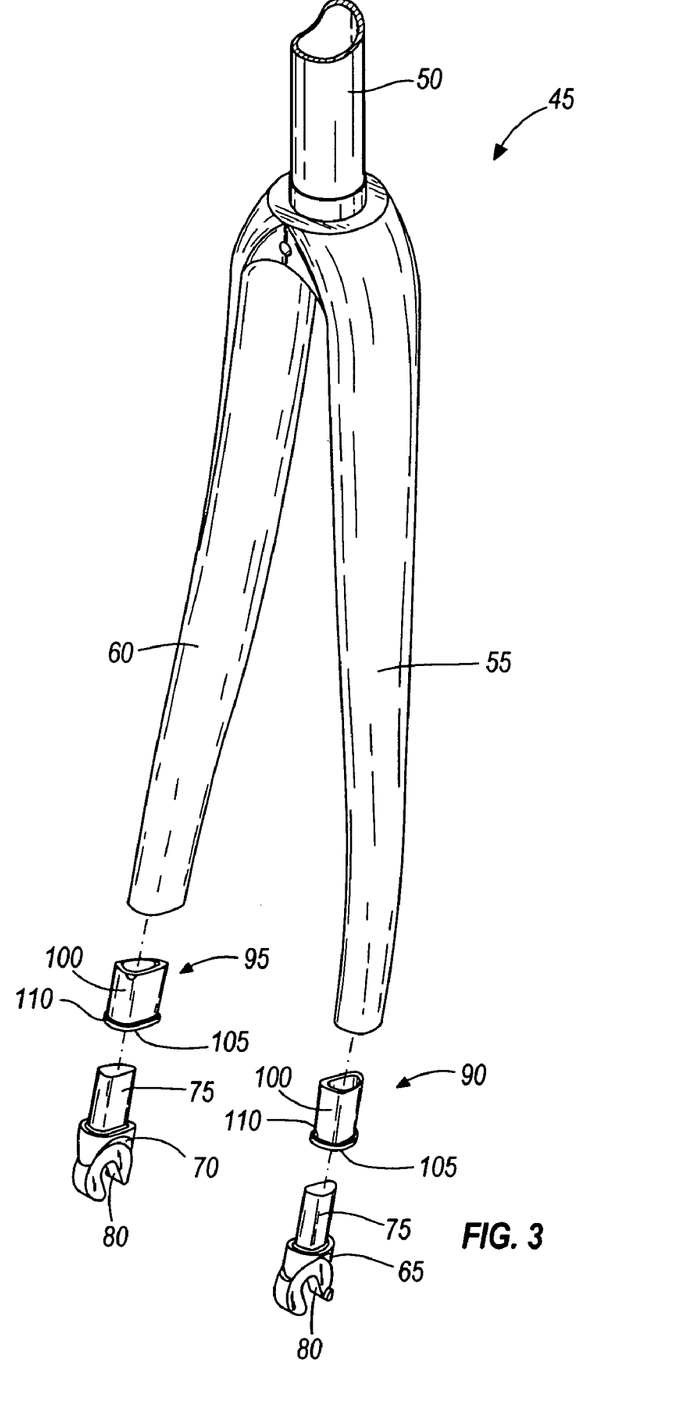
FIG. 3 is an exploded perspective view of the front fork of FIG. 2.
Figure 4:
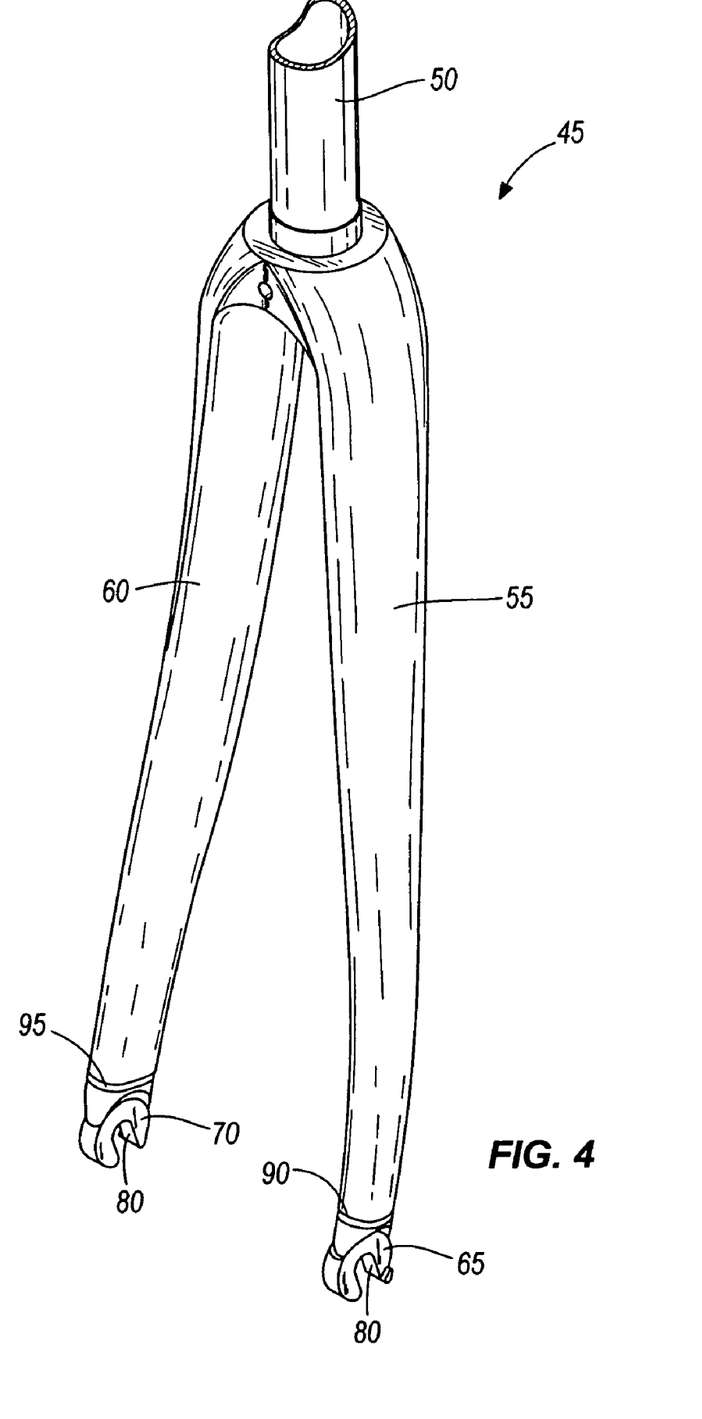
FIG. 4 is a perspective view of the front fork of FIG. 2.

A front fork 45 engages the head tube 30 and is rotatable relative to the head tube 30 to allow a rider to steer the bicycle 10. As shown in FIGS. 2-4, the front fork 45 includes a steer tube 50, a left fork tube 55, and a right fork tube 60. The steer tube 50 fits within the head tube 30 and rotationally attaches the front fork 45 to the frame 15, as is well known in the bicycle art. The left fork tube 55 and the right fork tube 60 are substantial mirror images of one another and are spaced apart from one another to define a front wheel space.

As shown in FIG. 3, a first front dropout member 65 fits within the left fork tube 55 and a second front dropout member 70 fits within the right fork tube 60. The first front dropout member 65 and the second front dropout member 70 are substantial mirror images of one another, with each front dropout member 65, 70 including an engagement portion 75 and a slot 80. Each slot 80 is positioned and arranged to receive an end of an axle (not shown) that supports the front wheel 20, as is known in the art. Thus, the front dropout members 65, 70 cooperate to support the front wheel 20 for rotation about the axle, while the front fork 45 is rotatable to steer the bicycle 10.

As shown in FIG. 3, a first front damping member 90 is positioned between the left fork tube 55 and the first front dropout member 65, and a second front damping member 95 is positioned between the right fork tube 60 and the second dropout member 70. Each front damping member 90, 95 includes a body portion 100 and a head portion 105. The illustrated body portion 100 is substantially tubular in that it includes an outer surface that substantially matches the contour of the inner surface of the corresponding fork tube 55, 60, and an inner surface that follows a similar contour to define a substantially constant wall thickness.

An adhesive may be used to bond the outer surface of the body portion 100 to the inner surface of the fork tube 55, 60 to attach the front damping members 90, 95 to the fork tubes 55, 60. In constructions that employ an adhesive, one or both of the mating surfaces may be roughened or grooved to provide additional surface area to improve the bond between the surfaces. In other constructions, a close fit or an interference fit is established between the front damping member 90, 95 and the fork tubes 55, 60 to retain the front damping members 90, 95 within the fork tubes 55, 60.

The head portion 105 includes an inner contour that substantially matches the inner contour of the body portion 100 and an outer contour that is larger than the outer surface of the body portion 100. Thus, the head portion 105 and body portion 100 cooperate to define a shoulder 110 that acts as a stop to inhibit insertion of the front damping members 90, 95 beyond a desired depth within the fork tubes 55, 60.

The engagement portions 75 of the front dropout members 65, 70 are contoured to fit within the respective front damping members 90, 95. As with the interface between the front damping members 90, 95 and the fork tubes 55, 60, an adhesive can be used to bond the engagement portions 75 to the inner surfaces of the front damping members 90, 95. In other constructions, a close fit or an interference fit is employed and no adhesive is required.

With the front dropout members 65, 70 inserted into their final operating positions as shown in FIG. 4, the head portions 105 of the front damping members 90, 95 are sandwiched between the dropout members 65, 70 and the ends of the fork tubes 55, 60, and are visible from the exterior of the fork tubes 55, 60 (as shown in FIGS. 2 and 4). In addition, the body portions 100 of the front damping members 90, 95 are disposed between the engagement portions 75 of the dropout members 65, 70 and the fork tubes 55, 60. Thus, neither of the dropout members 65, 70 makes direct physical contact with the front fork tubes 55, 60. Rather, the front damping members 90, 95 isolate the dropout members 65, 70 from the fork tubes 55, 60.

Figure 5:
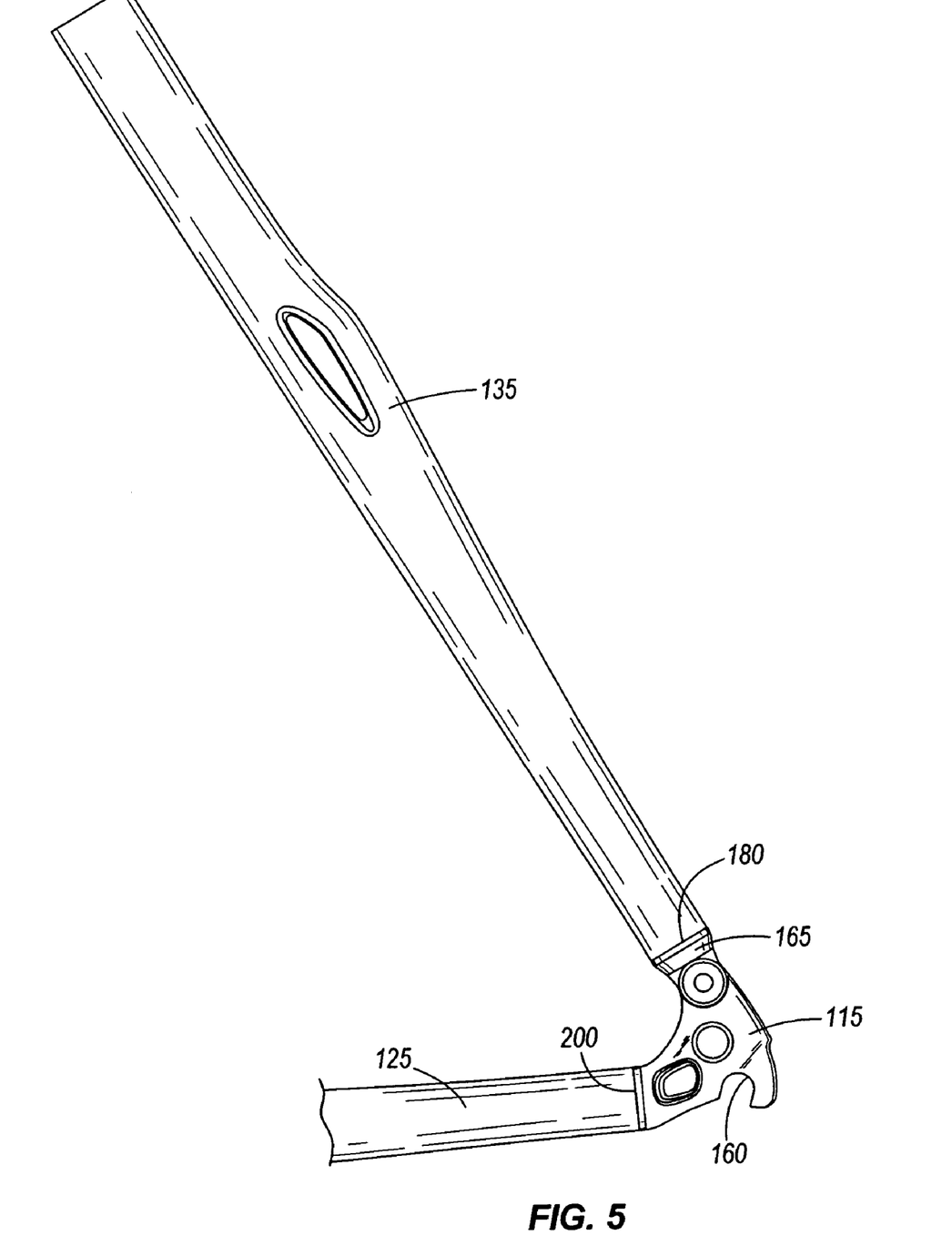
FIG. 5 is a side view of a rear portion of the frame of FIG. 2 including a rear dropout.
Figure 6:
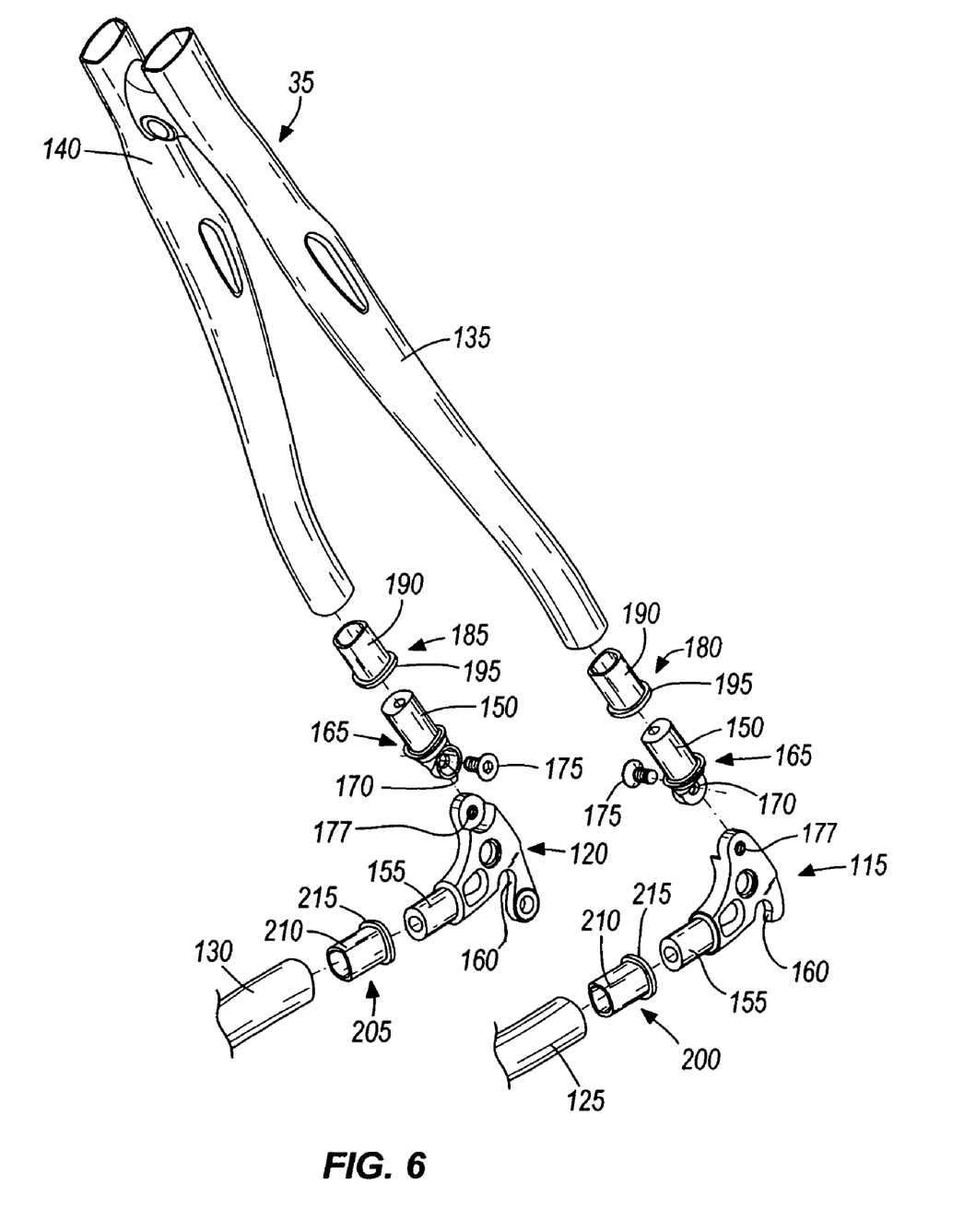
FIG. 6 is an exploded perspective view of the rear portion of the frame of FIG. 5.
Figure 7:
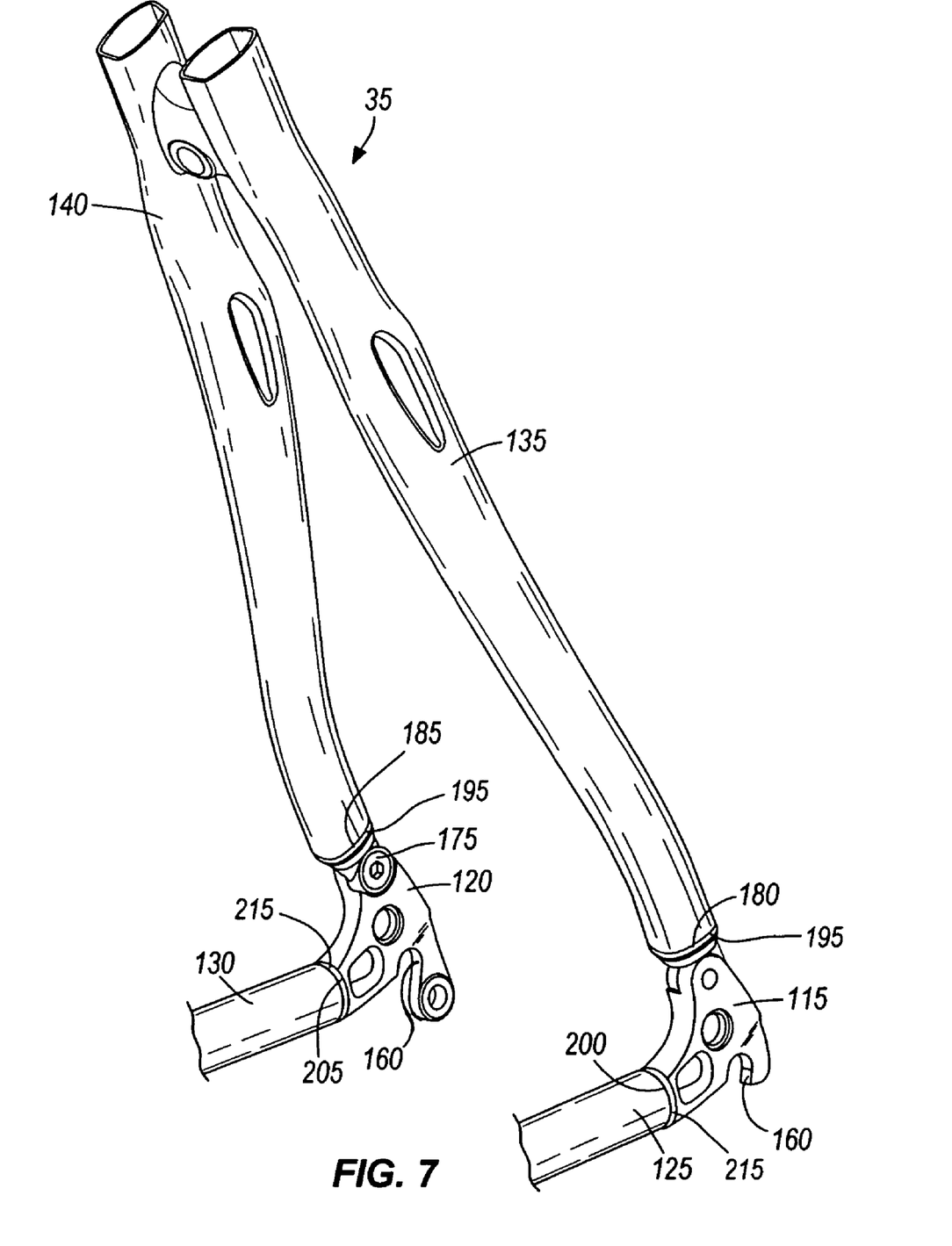
FIG. 7 is a perspective view of the rear portion of the frame of FIG. 5.

With reference to FIGS. 5-7, two rear dropouts 115, 120 are shown engaged with the chainstays 40 and the seatstays 35 to couple the rear wheel 25 to the frame 15. As illustrated in FIG. 6, the chainstays 40 include a left chainstay tube 125 and a right chainstay tube 130 and the seatstays 35 include a left seatstay tube 135 and a right seatstay tube 140. The dropouts 115, 120 engage opposite ends of a rear axle (not shown) such that the rear wheel 25 is rotatable about the rear axle. Generally, the left and right chainstay tubes 125, 130, the left and right seatstay tubes 135, 140, as well as the left rear dropout 115 and the right rear dropout 120 are substantial mirror images of one another.

Each rear dropout 115, 120 includes a seatstay engagement portion 150, a chainstay engagement portion 155, and an axle slot 160. The axle slot 160 engages one end of the rear axle to couple the rear dropout 115, 120 to the rear wheel 25. Thus, the two rear dropouts 115, 120 cooperate to support the rear axle such that the rear wheel 25 is free to rotate.

In the construction illustrated in FIG. 6, each of the seatstay engagement portions 150 is formed as part of a seatstay post 165 that attaches to the rest of the rear dropout 115, 120. Each seatstay post 165 includes an aperture 170 that receives a fastener 175 that threads into a threaded opening 177 in the corresponding rear dropout 115, 120. The use of the seatstay post 165 allows for a single rear dropout 115, 120 that is suitable for use with a variety of frame sizes. Pivoting the seatstay posts 165 relative to the rear dropouts 115, 120 accommodates different frame sizes. Specifically, the angle between the seatstays 35 and the chainstays 40 can be varied (i.e., between a small frame and a large frame), while still using common rear dropouts 115, 120. Of course other constructions may employ dropouts that include an integrally-formed seatstay post. Different size dropouts would then be manufactured for use with different size frames.

A first rear damping member 180 is positioned between the left rear dropout 115 and the left seatstay tube 135, and a second rear damping member 185 is positioned between the right rear dropout 120 and the right seatstay tube 140. The first and second rear damping members 180, 185 each include a body portion 190 and a head portion 195 much like the front damping members 90, 95. The body portions 190 each include an outer surface that defines an outer contour and an inner surface that defines an inner contour. The inner contour and the outer contour are similar to one another such that they define a substantially uniform wall thickness.

The outer surfaces of the first rear damping member 180 and the second rear damping member 185 fit closely within the respective ends of the seatstay tubes 135, 140. An adhesive may be used to attach the first and second rear damping members 180, 185 to the seatstay tubes 135, 140. Alternatively, an interference fit or a close fit could be employed. The head portion 195 inhibits insertion of the damping members 180, 185 beyond a desired position.

Each of the seatstay engagement portions 150 fit within one of the rear damping members 180, 185 and closely mate with the inner surfaces of the rear damping members 180, 185. Again, an adhesive, an interference fit, or a close fit could be employed to attach the seatstay posts 165 to the rear damping members 180, 185.

A third rear damping member 200 is positioned between the left rear dropout 115 and the left chainstay tube 125, and a fourth rear damping member 205 is positioned between the right rear dropout 120 and the right chainstay tube 130. The third and fourth rear damping members 200, 205 each include a body portion 210 and a head portion 215 much like the front damping members 90, 95 and the first and second rear damping members 180, 185. The body portions 210 each include an outer surface that defines an outer contour and an inner surface that defines an inner contour. The inner contour and the outer contour are similar to one another such that they define a substantially uniform wall thickness.

The outer surfaces of the third rear damping member 200 and the fourth rear damping member 210 fit closely within the respective ends of the chainstay tubes 125, 130. An adhesive may be used to attach the third and fourth rear damping members 200, 205 to the chainstay tubes 125, 130. Alternatively, an interference fit or a close fit could be employed. The head portions 215 inhibit insertion of the damping members 200, 205 beyond a desired position.

The chainstay engagement portions 155 fit within the third and fourth rear damping members 200, 205 and closely mate with the inner surfaces of the rear damping members 200, 205. Again, an adhesive, an interference fit, or a close fit could be employed to attach the chainstay engagement portions 155 to the third and fourth rear damping members 200, 205.

With the first, second, third, and fourth rear damping members 180, 185, 200, 205 positioned as desired, the rear dropout members 115, 120 do not make direct physical contact with the chainstays 40 or the seatstays 35. The body portions 190, 210 separate the engagement portions 150, 155 from the corresponding tubes, and the head portions 195, 215 are sandwiched between the corresponding tubes and rear dropout members 115, 120, and are visible from the exterior of the frame 15 (as shown in FIGS. 5 and 7).

The various damping members 90, 95, 180, 185, 200, 205 may include recesses or adhesive retention slots on the inner surfaces and on the outer surfaces of the body portions 100, 190, 210. In actual constructions, the depth of these adhesive retention slots would be about 0.05 mm, with deeper or shallower slots being possible. The slots receive and hold adhesive during assembly to provide an improved bond between the particular dropout member 65, 70, 115, 120 and the damping member 90, 95, 180, 185, 200, 205 and/or between the particular tube 55, 60, 125, 130, 135, 140 and the damping member 90, 95, 180, 185, 200, 205.

To improve the bond between the various damping members 90, 95, 180, 185, 200, 205, the dropout members 60, 65, 115, 120, and the various tubes 55, 60, 125, 130, 135, 140, some constructions may roughen the dropout member 60, 65, 115, 120 and/or the interface surface of the tube 55, 60, 125, 130, 135, 140. Sanding, scoring, knurling, sandblasting, or any other suitable process can be used to roughen the surfaces. The roughened surfaces produce more surface area and improve the bond between the damping member 90, 95, 180, 185, 200, 205 and the roughened surfaces.

It should be noted that while the various damping members 90, 95, 180, 185, 200, 205 have been described as having body portions 100, 190, 210 with substantially uniform wall thicknesses, other constructions may vary the wall thicknesses. For example, one construction may provide increased thickness on a load bearing side of the damping member to increase the damping effect. As such, the invention should not be limited to damping members that include uniform wall thicknesses in the body portions.

The various damping members 90, 95, 180, 185, 200, 205 are made from an elastomeric material. In the illustrated embodiment, the damping members 90, 95, 180, 185, 200, 205 are made from a thermoplastic molded elastomer sold under the trademark SANTOPRENE by Advanced Elastomer Systems of Akron, Ohio. The damping members 90, 95, 180, 185, 200, 205 could instead be made from any suitable material, such as polyurethane, plastic, natural rubber, and the like.

The thickness and durometer of the various damping members 90, 95, 180, 185, 200, 205 are chosen to achieve the desired damping, while still maintaining the desired "feel" between the rider and the bicycle 10. For example, a material with an improper durometer and thickness may provide significant damping but may feel "soft" to the rider. On the other hand, a high durometer coupled with a thin wall thickness may result in insufficient damping.

In operation, the bicycle 10 is assembled with the damping members 90, 95, 180, 185, 200, 205 positioned as described. As the rider rides along a path, various bumps or holes are encountered that cause impacts and vibrations at one or both of the front wheel 20 and rear wheel 25. On a prior art bicycle, these impacts or vibrations would travel from the wheel, to the axle, from the axle to the dropout, from the dropout to the frame, and from the frame to the rider's body. With the damping members 90, 95, 180, 185, 200, 205 positioned between the dropouts 65, 70, 115, 120, and the frame tubes as described, a large portion of the vibrations and bumps are absorbed by the damping members 90, 95, 180, 185, 200, 205. Thus, any vibrations or forces that would normally be felt by the rider are reduced.

As one of ordinary skill will realize, there is no requirement that a bicycle 10 employ all of the damping members 90, 95, 180, 185, 200, 205 discussed herein. For example, one bicycle may include only the front damping members 90, 95 or only the rear damping members 180, 185, 200, 205. Another construction may include damping members 180, 185 between the rear dropouts 115, 120 and the seatstays 35 but no damping members between the rear dropouts 115, 120 and the chainstays 40. Thus, various combinations of damping members could be employed depending on the desired level of damping.

Although the invention has been described in detail with reference to certain preferred embodiments, variations and modifications exist within the scope and spirit of the invention as described and defined in the following claims.

What is claimed is:

1. A bicycle frame comprising:
a seatstay including a seatstay tube;
a chainstay including a chainstay tube;
a dropout member coupled to the seatstay tube and the chainstay tube, the seatstay tube and the dropout member cooperating to define a seatstay gap therebetween;
a seatstay damping member disposed between the seatstay tube and the dropout member, the seatstay damping member including a body portion positioned in the seatstay gap; and
a chainstay damping member disposed between the chainstay tube and the dropout member.

2. The bicycle frame of claim 1, wherein the chainstay tube and the dropout member cooperate to define a chainstay gap therebetween, and wherein the chainstay damping member includes a body portion positioned in the chainstay gap.

3. The bicycle frame of claim 1, wherein the seatstay damping member bonds the seatstay tube to the dropout member.

4. The bicycle frame of claim 3, wherein the chainstay damping member bonds the chainstay tube to the dropout member.

5. The bicycle frame of claim 1, wherein the seatstay damping member and the chainstay damping member each comprise an elastomer portion.

6. A bicycle frame comprising:
a seatstay including a seatstay tube;
a dropout member coupled to and partially disposed within the seatstay tube, the seatstay tube and the dropout member cooperating to define a radial seatstay gap therebetween; and
a seatstay damping member disposed between the seatstay tube and the dropout member, the seatstay damping member including a body portion positioned in the radial seatstay gap to separate the dropout member from the seatstay tube, the body portion having an outer surface engaged with the seatstay tube and an inner surface engaged with the dropout member.

7. A bicycle frame comprising:
a chainstay including a chainstay tube;
a dropout member coupled to and partially disposed within the chainstay tube, the chainstay tube and the dropout member cooperating to define a radial chainstay gap therebetween; and
a chainstay damping member disposed between the chainstay tube and the dropout member, the chainstay damping member including a body portion positioned in the radial chainstay gap to separate the dropout member from the chainstay tube, the body portion having an outer surface engaged with the chainstay tube and an inner surface engaged with the dropout member.

* * * * *